Sept. 17, 1929.  W. C. WHITE  1,728,816
SIGNALING SYSTEM
Filed Jan. 19, 1924
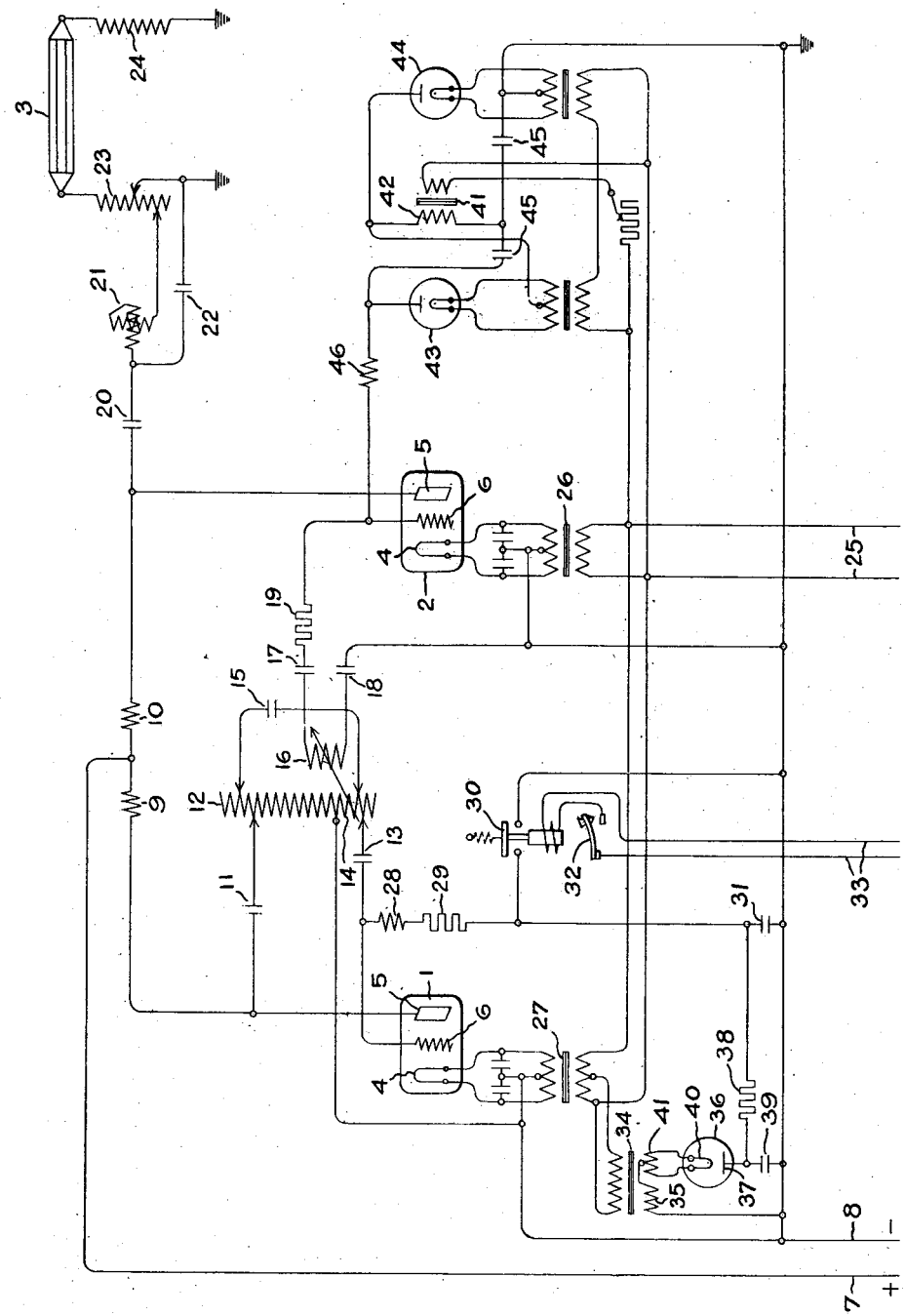
Inventor:
William C. White,
by Alexander S. ———
His Attorney.

Patented Sept. 17, 1929

1,728,816

UNITED STATES PATENT OFFICE

WILLIAM C. WHITE, OF SCHENECTADY, NEW YORK, ASSIGNOR TO GENERAL ELECTRIC COMPANY, A CORPORATION OF NEW YORK

SIGNALING SYSTEM

Application filed January 19, 1924. Serial No. 687,361.

My present invention relates to signaling systems, and more particularly to transmitting apparatus for high frequency signaling.

The object of my invention is to provide improvements in apparatus for producing and amplifying high frequency currents and utilizing such currents for signaling purposes, such for example as radio telegraphy.

The novel features which I believe to be characteristic of my invention are set forth with particularity in the appended claims; my invention itself, however, both as to its organization and method of operation will best be understood by reference to the following description taken in connection with the accompanying drawing in which I have shown diagrammatically a circuit organization whereby my invention may be carried into effect.

I have indicated in the drawing a radio transmitting system comprising a three-electrode electron discharge device 1 of the thermionic type, which is employed for the purpose of producing high frequency oscillations, and a second device 2 of the same type, which is employed for amplifying the oscillations produced by the first device, and then supplying the amplified oscillations to transmitting antenna 3. Devices 1 and 2 each comprise the usual cathode 4, anode 5 and grid 6. Current for the operation of the anode or plate circuits of the two devices is furnished by a source of high potential direct current connected to the supply conductors 7 and 8. The positive terminal of the direct current supply source is connected to the anodes 5 through choking inductances 9 and 10, which prevent the high frequency currents produced in the system from flowing through the source of supply. The anode 5 of device 1 is connected through a blocking condenser 11 and a portion of the inductance 12 to the cathode 4. The grid 6 of device 1 is connected through a grid condenser 13 and a portion 14 of the inductance 12, to the cathode 4. A portion of the inductance 12 is also shunted by a condenser 15. This condenser in connection with the coil 12 forms an oscillating circuit which determines the frequency of the oscillations produced by device 1. Oscillations produced in this oscillating circuit are supplied by means of a coupling coil 16 to the grid circuit of device 2, this grid circuit including a grid condenser 17, a by-pass condenser 18, and a series resistance 19. The high frequency oscillations thus supplied to the grid circuit of device 2 are amplified and supplied through a blocking condenser 20 to a storage circuit made up of the variable inductance 21 and condenser 22. This storage circuit is coupled in the manner indicated to loading coil 23 on the antenna 3. This antenna may be of the multiple tuned type having as many separate loading coils as desired. In the present case only two, 23 and 24 are shown.

The current for heating cathodes 4 of the two devices is furnished through transformers 26, 27 from an alternating current source connected to supply mains 25. The grid condenser 13 in the grid circuit of device 1 is shunted by a choking inductance 28 and a resistance 29, which are connected in series with a relay device 30, this relay device being connected in shunt to the keying condenser 31. The relay 30 may be actuated by means of a key 32 connected in a circuit with any suitable source of power supplied by the mains 33 for operating the relay 30.

When the power output of an oscillator is comparatively small the system thus far described is quite satisfactory. When the relay 30 is closed oscillations will be produced and as soon as the relay is opened a negative charge of sufficient value to interrupt the production of oscillations will be built up on the grid by reason of the presence of condensers 13 and 31. As soon as oscillations are stopped the negative charge on the grid tends to leak off and there is a tendency for the device to start oscillating again. As soon as oscillations start again, the negative charge on the grid again will be built up and the production of oscillations will be interrupted. The length of time between these intermittent oscillations depends on the leakage of the grid charge which in turn depends upon the insulation of the grid circuit and of the tube.

With low power devices these intermittent oscillations are not of sufficient intensity to be objectionable, but when considerable power is used this effect is objectionable because it causes interference. The magnitude of these oscillations is a function of the tube efficiency, the higher the efficiency the greater the magnitude because of the fact that a higher initial voltage is required to start oscillations.

To overcome this disadvantage I have provided a means for furnishing a negative bias upon the grid 6 of oscillator 1, which is effective as soon as relay 30 is opened. This negative bias is provided by means of an alternating current which is impressed upon the grid circuit by means of a transformer 34. The portion 35 of the secondary turns of transformer 34 is connected in series with the thermionic rectifier 36, the anode 37 of which is connected through a high resistance 38 to one side of the keying condenser 31. The smoothing condenser 39 is provided for smoothing out the variations in the alternating potential thus applied to the grid, and insuring the proper operation of the rectifier. The cathode 40 of the rectifier 36 may be heated by means of alternating current supplied by the turns 41 of the secondary of transformer 34. It will be observed that when the relay 30 is closed this source of biasing potential is short circuited. The high resistance 38 is provided to prevent the flow of excessive current through the rectifier 36 during periods when the key 32 is closed. This method of keying is also preferable to those in which oscillations are interrupted by the building up of a negative charge on the grid through a grid condenser as both the starting and the stopping of oscillations are more abrupt. This gives a cleaner signal and also permits of higher speed signaling.

When the key 32 is closed the potential of the grid of oscillator 1 is suddenly raised from a negative value to zero. The resulting rush of current due to this change has a tendency to make the grid positive and cause a sudden rush of plate current. This has a tendency to make the grid still more positive by reason of dynatron action, and as a result the tube 1 may draw so much current that it will be destroyed. The use of the series resistance 29 eliminates this difficulty by limiting the first rush of grid current.

A biasing potential for the grid of amplifier 2 is also provided from the alternating current source. Transformer 41, the primary of which is connected to the alternating current source has its secondary 42 connected to thermionic rectifiers 43 and 44. One end of the secondary 42 is connected to the anode of rectifier 44 and to the cathode of rectifier 43 while the other end of the secondary 42 is connected through condensers 45 to the cathode of rectifier 44 and to the anode of rectifier 43. The anode of rectifier 43 is connected to the grid 6 of amplifier 2 through a choking inductance 46. By this arrangement a negative biasing voltage is obtained which is twice that of the alternating current voltage of the secondary 42 and this total voltage is divided between the two rectifiers 43 and 44, which are connected in series. The use of the rectifiers for furnishing the biasing voltage for the grid also has a particular advantage in the case of the power amplifier tube. When the key 32 is opened and the production of oscillations by oscillator 1 is interrupted the grid 6 of amplifier 2 is given an impulse in a positive direction and this impulse may be sufficient to reverse the potential of the grid and produce dynatron action. The rectifiers 43 and 44 however, minimize the amplitude of the positive grid potential and therefore tend to prevent the occurrence of dynatron action.

While I have shown and described only one embodiment of my invention, it will be apparent that many modifications in the circuit arrangements employed may be made without departing from the scope of my invention as set forth in the appended claims.

What I claim as new and desire to secure by Letters Patent of the United States, is:

1. The combination with an electron discharge device having a cathode, an anode, and a grid, of means for impressing a negative potential upon the grid of said device comprising a source of alternating current and a rectifying device having asymmetric conductivity serially connected in a circuit between said cathode and said grid, the grid of said electron discharge device being substantially insulated from the cathode with respect to direct current except through said rectifying device and the space within said discharge device whereby said rectifying device is effective to prevent a reversal in direction of the current flow in the grid circuit.

2. The combination with an electron discharge device having a cathode, an anode and a grid and having grid and anode circuits, of means for supplying signal representing high frequency oscillations from the anode circuit to a transmission circuit, and means for impressing a negative potential upon the grid comprising a low frequency source of alternating current, and a rectifying device having asymmetric conductivity serially connected in the grid circuit, the grid of said electron discharge device being substantially insulated from the cathode with respect to direct current except through said rectifying device and the space within said discharge device whereby said rectifying device is effective to prevent a reversal in direction of the current flow in the grid circuit.

3. The combination with an electron discharge device having a cathode, an anode and a grid, of a circuit between cathode and grid which includes a series condenser, a circuit in shunt to said condenser which includes a resistance and a second condenser, and a source of alternating current and a rectifier connected in shunt to said second condenser.

4. The combination with an electron discharge device having a cathode, an anode and a grid, of a circuit between cathode and grid which includes a series condenser, a circuit in shunt to said condenser which includes a resistance and a second condenser, and a source of alternating current, a high resistance, and a rectifier connected in shunt to said second condenser.

5. The combination with an electron discharge device having a cathode, an anode and a grid, of a circuit between cathode and grid which includes a series condenser, a circuit in shunt to said condenser which includes a resistance and a second condenser, a source of alternating current and a rectifier connected in shunt to said condenser, and a signaling device connected in shunt to said second condenser.

In witness whereof, I have hereunto set my hand this 18th day of January, 1924.

WILLIAM C. WHITE.